(12) United States Patent
Howard et al.

(10) Patent No.: US 11,734,545 B2
(45) Date of Patent: Aug. 22, 2023

(54) HIGHLY EFFICIENT CONVOLUTIONAL NEURAL NETWORKS

(71) Applicant: Google LLC, Mountain View, CA (US)

(72) Inventors: Andrew Gerald Howard, Culver City, CA (US); Mark Sandler, Mountain View, CA (US); Liang-Chieh Chen, Los Angeles, CA (US); Andrey Zhmoginov, Mountain View, CA (US); Menglong Zhu, Playa Vista, CA (US)

(73) Assignee: GOOGLE LLC, Mountain View, CA (US)

( * ) Notice: Subject to any disclaimer, the term of this patent is extended or adjusted under 35 U.S.C. 154(b) by 1416 days.

(21) Appl. No.: 15/898,566

(22) Filed: Feb. 17, 2018

(65) Prior Publication Data

US 2019/0147318 A1     May 16, 2019

Related U.S. Application Data

(60) Provisional application No. 62/586,007, filed on Nov. 14, 2017.

(51) Int. Cl.
*G06N 3/04*     (2023.01)
*G06N 3/08*     (2023.01)
(Continued)

(52) U.S. Cl.
CPC .............. *G06N 3/04* (2013.01); *G06N 3/045* (2023.01); *G06N 3/08* (2013.01); *G06N 3/048* (2023.01)

(58) Field of Classification Search
CPC .......... G06N 3/04; G06N 3/0454; G06N 3/08; G06N 3/0481
See application file for complete search history.

(56) References Cited

U.S. PATENT DOCUMENTS

| 11,354,577 | B2 | 6/2022 | Ren et al. |
| 2018/0240235 | A1 | 8/2018 | Mazo |
| 2019/0179674 | A1* | 6/2019 | Huang ............... G06V 10/82 |

OTHER PUBLICATIONS

Chang, Jia-Ren, and Yong-Sheng Chen. "Deep competitive pathway networks." Asian Conference on Machine Learning. PMLR, 2017. (Year: 2017).*

(Continued)

*Primary Examiner* — Ying Yu Chen
*Assistant Examiner* — Sidney Vincent Bostwick
(74) *Attorney, Agent, or Firm* — Dority & Manning, P.A.

(57) ABSTRACT

The present disclosure provides directed to new, more efficient neural network architectures. As one example, in some implementations, the neural network architectures of the present disclosure can include a linear bottleneck layer positioned structurally prior to and/or after one or more convolutional layers, such as, for example, one or more depthwise separable convolutional layers. As another example, in some implementations, the neural network architectures of the present disclosure can include one or more inverted residual blocks where the input and output of the inverted residual block are thin bottleneck layers, while an intermediate layer is an expanded representation. For example, the expanded representation can include one or more convolutional layers, such as, for example, one or more depthwise separable convolutional layers. A residual shortcut connection can exist between the thin bottleneck layers that play a role of an input and output of the inverted residual block.

20 Claims, 9 Drawing Sheets

(51) Int. Cl.
　　　G06N 3/045　　(2023.01)
　　　G06N 3/048　　(2023.01)

(56) References Cited

OTHER PUBLICATIONS

Szegedy, Christian, et al. "Going deeper with convolutions." Proceedings of the IEEE conference on computer vision and pattern recognition. 2015. (Year: 2015).*
Jégou, Simon, et al. "The one hundred layers tiramisu: Fully convolutional densenets for semantic segmentation." Proceedings of the IEEE conference on computer vision and pattern recognition workshops. 2017. (Year: 2017).*
Abadi et al., "TensorFlow: Large-Scale Machine Learning on Heterogeneous Distributed Systems", arXiv: 1603.04467v2, Mar. 16, 2016, 19 pages.
Ahmed et al., "Connectivity Learning in Multi-Branch Networks", arXiv:1709.09582v2, Dec. 7, 2017, 17 pages.
Bergstra et al., "Random Search for Hyper-Parameter Optimization", Journal of Machine Learning Research, vol. 13, Feb. 2012, pp. 281-305.
Changpinyo et al., "The Power of Sparsity in Convolutional Neural Networks", arXiv: 1702.06257v1, Feb. 21, 2017, 13 pages.
Chen et al., "Deeplab: Semantic Image Segmentation with Deep Convolutional Nets, Atrous Convolution, and Fully Connected CRFs", arXiv: 1606.00915v2, May 12, 2017, 14 pages.
Chen et al., "Rethinking Atrous Convolution for Semantic Image Segmentation", arXiv: 1706.05587v3, Dec. 5, 2017, 14 pages.
Chollet, "Xception: Deep Learning with Depthwise Separable Convolutions", IEEE Conference on Computer Vision and Pattern Recognition, Honolulu, Hawaii, Jul. 22-25, 2017, 8 pages.
Dai et al., "Object Detection via Region-Based Fully Convolutional Networks", Advances in Neural Information Processing Systems, Barcelona, Spain, Dec. 5-10, 2016, pp. 379-387.
Esteban et al., "Large-Scale Evolution of Image Classifiers", 34th International Conference on Machine Learning, Sydney, New South Wales, Australia, Aug. 6-11, 2017, pp. 2902-2911.
Everingham et al., "The Pascal Visual Object Classes Challenge a Retrospect", International Journal on Computer Vision, vol. 111, Issue 1, Jan. 2015, pp. 98-136.
Guo et al., "Dynamic Network Surgery for Efficient DNNS", Advances in Neural Information Processing Systems, Barcelona, Spain, Dec. 5-10, 2016, pp. 1379-1387.
Han et al., "DSD: Regularizing Deep Neural Networks with Dense-Sparse-Dense Training Flow", arXiv: 1607.04381v1, Jul. 15, 2016, 12 pages.
Han et al., "Learning Both Weights and Connections for Efficient Neural Network", Advances in Neural Information Processing Systems, Montreal, Quebec, Canada, Dec. 7-12, 2015, pp. 1135-1143.
Hariharan et al., "Semantic Contours from Inverse Detectors", International Conference on Computer Vision, Barcelona Spain, Nov. 6-13, 2011, 8 pages.
Hassibi et al., "Second Order Derivatives for Network Pruning: Optimal Brain Surgeon", Advances in Neural Information Processing Systems, Denver, Colorado, Nov. 30-Dec. 3, 1992, pp. 164-171.
He et al., Deep Residual Learning for Image Recognition, arXiv: 1512.03385v1, Dec. 10, 2015, 12 pages.
Holschneider et al., "A Real-Time Algorithm for Signal Analysis with the Help of the Wavelet Transform, Wavelets" Time-Frequency Methods and Phase Space, 1989, pp. 286-297.
Howard et al., "Efficient Convolutional Neural Networks for Mobile Vision Applications", arXiv: 1704.04861v1, Apr. 17, 2017, 9 pages.
Huang et al., "Speed/Accuracy Trade-Offs for Modern Convolutional Object Detectors", Conference on Computer Vision and Pattern Recognition, Honolulu, Hawaii, Jul. 21-26, 2017, 10 pages.
Huang et al., "Tensorflow Object Detection API", https://github.com/tensorflow/models/tree/master/research/object_detection, retrieved on Feb. 13, 2018, 5 pages.
Jia et al., "Caffe: Convolutional Architecture for Fast Feature Embedding", arXiv: 1408.5093v1, Jun. 20, 2014, 4 pages.
Krizhevsky et al., "ImageNet Classification with Deep Convolutional Neural Networks", Proceedings of Neural Information Processing Systems—vol. 1, Lake Tahoe, Nevada, Dec. 3-6, 2012, pp. 1106-1114.
LeCun et al., "Optimal Brain Damage", Advances in Neural Information Processing Systems 2, Denver, Colorado, Nov. 27-30, 1989, pp. 598-605.
Li et al., "Pruning Filters for Efficient Convnets", arXiv:1608.08710v2, Sep. 15, 2016, 9 pages.
Lin et al., "Microsoft COCO: Common Objects in Context", arXiv: 1405.0312v2, Jul. 5, 2014, 14 pages.
Liu et al., "ParseNet: Looking Wider to See Better", arXiv: 1506.04579v2, Nov. 19, 2015, 11 pages.
Liu et al., "SSD: Single Shot Multibox Detector", 14th European Conference on Computer Vision, Amsterdam, The Netherlands, Oct. 8-16, 2016, pp. 21-37.
Papandreou et al., "Modeling Local and Global Deformations in Deep Learning: Epitomic Convolution, Multiple Instance Learning, and Sliding Window Detection", IEEE Conference on Computer Vision and Pattern Recognition, Boston, Massachusetts, Jun. 7-12, 2015, 10 pages.
Redmon et al., "Yolo9000: Better, Faster, Stronger", arXiv: 1612.08242v1, Dec. 25, 2016, 9 pages.
Ren et al., "Faster R-CNN: Towards Real-Time Object Detection with Region Proposal Networks", Advances in Neural Information Processing Systems, Montreal, Canada, Dec. 7-12, 2015, pp. 91-99.
Russakovsky et al., "ImageNet Large Scale Visual Recognition Challenge", International Journal of Computer Vision, vol. 115, Issue 3, Dec. 2015, pp. 211-252.
Sermanet et al., "Overfeat: Integrated Recognition, Localization and Detection Using Convolutional Networks", arXiv:1312.6229v4, Feb. 24, 2014, 16 pages.
Simonyan et al., "Very Deep Convolutional Networks for Large-Scale Image Recognition", arXiv: 1409.1556v5, Dec. 23, 2014, 13 pages.
Snoek et al., "Practical Bayesian Optimization of Machine Learning Algorithms", Conference on Neural Information Processing Systems—vol. 2, Lake Tahoe, Nevada, Dec. 3-6, 2012, pp. 2960-2968.
Snoek et al., "Scalable Bayesian Optimization Using Deep Neural Networks", Conference on Machine Learning, Lille, France, Jul. 6-11, 2015, vol. 37, pp. 2171-2180.
Szegedy et al., "Going Deeper with Convolutions", arXiv:1409.4842v1, Sep. 17, 2014, 12 pages.
Szegedy et al., "Inception-v4, Inception-ResNet and the Impact of Residual Connections on Learning", arXiv: 1602.07261v2, Aug. 23, 2016, 12 pages.
Veit et al., "Residual Networks are Exponential Ensembles of Relatively Shallow Networks", arXiv: 1605.06431v2, Oct. 27, 2016, 9 pages.
Veniat et al., "Learning Time-Efficient Deep Architectures with Budgeted Super Networks", arXiv: 1706.00046v2, Nov. 27, 2017, 13 pages.
Wang et al., "Design of Efficient Convolutional Layers Using Single Intra-Channel Convolution, Topological Subdivisioning and Spatial 'Bottleneck' Structure", arXiv: 1608.04337v2, Jan. 24, 2017, 9 pages.
Xie et al., "Aggregated Residual Transformations for Deep Neural Networks", arXiv: 1611.05431v2, Apr. 11, 2017, 10 pages.
Xie et al., "Genetic CNN", arXiv: 1703.01513v1, Mar. 4, 2017, 10 pages.
Zhang et al., "Sufflenet: An Extremely Efficient Convolutional Neural Network for Mobile Devices", arXiv: 1707.01083v2, Dec. 7, 2017, 9 pages.
Zoph et al., "Learning Transferable Architectures for Scalable Image Recognition", arXiv: 1707.07012v3, Dec. 1, 2017, 14 pages.
Zoph et al., "Neural Architecture Search with Reinforcement Learning", arXiv: 1611.01578v2, Feb. 15, 2017, 16 pages.
International Search Report and Written Opinion for PCT/US2018/046022, dated Nov. 20, 2018, 16 pages.

(56) References Cited

OTHER PUBLICATIONS

Chang et al., "Deep Competitive Pathway Networks", arXiv.org, Cornell University Library, Ithaca, New York, Sep. 29, 2017, 16 pages.
Chollet et al., Xception: Deep Learning with Depthwise Separable Convolutions, Apr. 4, 2017, https://arxiv.org/pdf/1610.02357.pdf, retrieved on Aug. 15, 2018.
Qassim et al., "The Compressed Model of Residual CNDS", Jun. 15, 2017, https://arxiv.org/ftp/arxiv/papers/1706/1706.06419.pdf, retrieved on Nov. 8, 2018.
Sandler, et al., "MobileNetV2: Inverted Residuals and Linear Bottlenecks", Apr. 2, 2018, https://arxiv.org/pdf/1801.04381.pdf, retrieved on Nov. 7, 2018.
Zhang et al., "ShuffleNet: An Extremely Efficient Convolutional Neural Network for Mobile Devices", arXiv.org, Cornell University Library, Ithaca, New York, Jul. 4, 2017.
Gomez et al., "The Reversible Residual Network: Backpropagation Without Storing Activations", Advances in neural information processing systems 30, 2017, 11 pages.
Jegou et al., "The One Hundred Layers Tiramisu: Fully Convolutional DenseNets for Semantic Segmentation", Proceedings of the IEEE conference on computer vision and pattern recognition workshops, 2017, pp. 11-19.
Parde et al., "Deep Convolutional Neural Network Features and the Original Image", arXiv:1611.01751v1, Nov. 6, 2016, 7 pages.
Rodrigues, "Exploring the Transfer Learning Aspect of Deep Neural Networks in Facial Information Processing", University of Manchester, 2003, 90 pages.

\* cited by examiner

HIGHLY EFFICIENT CONVOLUTIONAL NEURAL NETWORKS

RELATED APPLICATIONS

This application claims priority to and the benefit of U.S. Provisional Patent Application No. 62/586,007, titled "Highly Efficient Convolutional Neural Networks" and filed on Nov. 24, 2017. U.S. Provisional Patent Application No. 62/586,007 is hereby incorporated by reference herein in its entirety.

FIELD

The present disclosure relates generally to artificial neural networks ("neural networks"). More particularly, the present disclosure relates to efficient convolutional neural network structures for mobile and/or embedded vision applications and also to techniques to reduce computational costs and/or memory requirements associated with convolutional neural networks.

BACKGROUND

Convolutional neural networks have become the workhorse of computer vision and have achieved state of the art results in most major use cases. A general trend in the field of convolutional neural networks has been to make bigger and more complicated networks in order to achieve higher accuracy. As convolutional neural networks increase in size and complexity in service of increased accuracy, so too do they increase in computational cost. At a certain point, however, these advances yield diminishing returns, as adding complexity, size, and additional computation result in only small gains in accuracy.

The current trend toward bigger and more complicated networks is particularly problematic in the context of computing environments where certain computing resources, such as memory and processing capability, are limited. For example, mobile computing devices and/or embedded computing present challenging environments for the implementation of such large and complicated networks. Furthermore, in certain scenarios or applications, the problem to be solved by the network may not require a large, complex model that provides state of the art accuracy.

Thus, techniques for reducing computational costs and/or memory requirements of neural networks (e.g., convolutional neural networks) are desired. In some instances, such techniques can be referred to as performing neural network compression.

One general direction for neural network compression is network pruning, in which a subset of the connections included in a network is removed. However, if there are no constraints on which connections/parameters are to be removed, network pruning often results in an irregular network. Such a network is undesirable because computational savings cannot be easily exploited and the unstructured nature of connections requires extra efforts to represent. These drawbacks affect negatively on training time and memory usage. On the other hand, if the constraints on the parameters to be removed are too restrictive, the model flexibility is diminished.

Another direction for neural network compression brings optimization methods including genetic algorithms and reinforcement learning to architectural search. However one drawback is that the resulting networks end up being overly complex.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors and one or more non-transitory computer-readable media that store a convolutional neural network implemented by the one or more processors. The convolutional neural network includes one or more convolutional blocks. Each of the one or more convolutional blocks includes a linear bottleneck layer and one or more convolutional layers.

Another example aspect of the present disclosure is directed to a computing system that includes one or more processors and one or more non-transitory computer-readable media that store a convolutional neural network implemented by the one or more processors. The convolutional neural network includes one or more inverted residual blocks. Each of the one or more inverted residual blocks includes one or more convolutional layers configured to provide a first output and a linear bottleneck layer configured to receive the first output and generate a second output. The linear bottleneck layer is further configured to receive a residual and add the residual to the second output to provide a third output.

Another example aspect of the present disclosure is directed to a computing system that includes one or more processors and one or more non-transitory computer-readable media that store a convolutional neural network implemented by the one or more processors. The convolutional neural network includes one or more convolutional blocks. Each of the one or more convolutional blocks includes a linear layer and one or more non-linear convolutional layers.

Another example aspect of the present disclosure is directed to a computing system that includes one or more processors and one or more non-transitory computer-readable media that store a convolutional neural network implemented by the one or more processors. The convolutional neural network includes one or more inverted residual blocks. Each of the one or more inverted residual blocks includes one or more convolutional layers configured to provide a first output and a linear layer configured to receive the first output and generate a second output. The linear layer is further configured to receive a residual and add the residual to the second output to provide a third output.

Another example aspect of the present disclosure is directed to a computing system that includes one or more processors and one or more non-transitory computer-readable media that store a convolutional neural network implemented by the one or more processors. The convolutional neural network includes one or more inverted residual blocks. Each of the one or more inverted residual blocks includes a linear bottleneck layer that provides a first output and one or more convolutional layers that receive the first output and generate a second output. The linear bottleneck layer is configured to provide a residual that describes the first output to a downstream linear bottleneck layer via a residual shortcut connection.

Another example aspect of the present disclosure is directed to a neural network system implemented by one or more computers. The neural network system is configured to receive an input image and to generate an output for the input image. The neural network system includes a convolutional subnetwork. The convolutional subnetwork includes a linear bottleneck layer and one or more convolutional layers.

Another example aspect of the present disclosure is directed to a neural network system implemented by one or more computers. The neural network system is configured to receive an input image and to generate an output for the input image. The neural network system includes an inverted residual subnetwork. The inverted residual subnetwork includes one or more convolutional layers configured to provide a first output and a linear layer configured to receive the first output and generate a second output. The linear layer is further configured to receive a residual and add the residual to the second output to provide a third output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
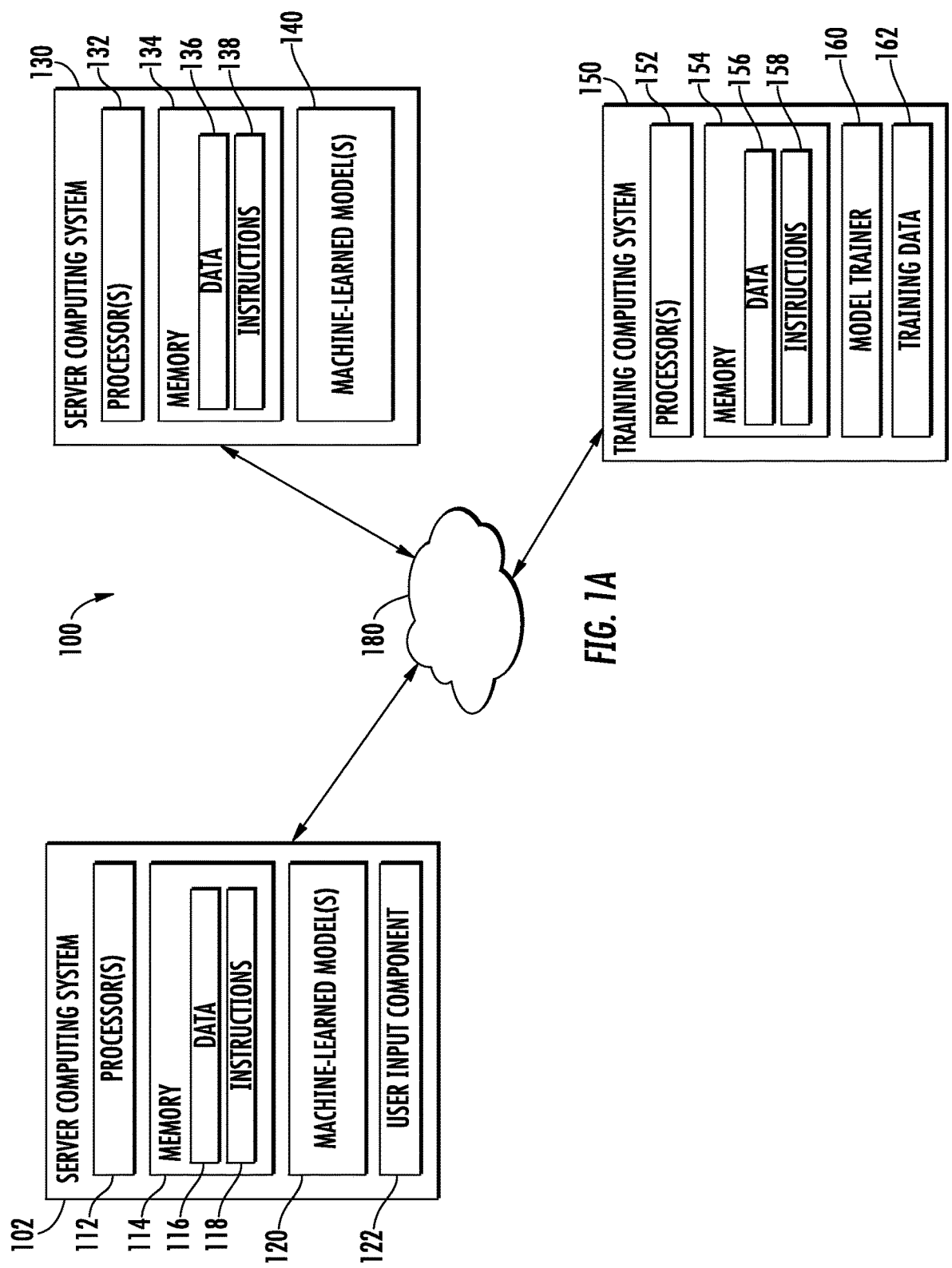
FIG. 1A depicts a block diagram of an example computing system according to example embodiments of the present disclosure.

Reference numerals that are repeated across plural figures are intended to identify the same features in various implementations.

DETAILED DESCRIPTION

1. Overview

Example aspects of the present disclosure are directed to new, more efficient neural network architectures. As one example, in some implementations, the neural network architectures of the present disclosure can include a linear bottleneck layer positioned structurally prior to and/or after one or more convolutional layers, such as, for example, one or more depthwise separable convolutional layers. As another example, in some implementations, the neural network architectures of the present disclosure can include one or more inverted residual blocks where the input and output of the inverted residual block are thin bottleneck layers, while an intermediate layer is an expanded representation. For example, the expanded representation can include one or more convolutional layers, such as, for example, one or more depthwise separable convolutional layers. According to another aspect of the present disclosure, a residual shortcut connection can exist between the thin bottleneck layers that play a role of an input and output of the inverted residual block. Further, as described above, the bottleneck layers can be linear in nature. The neural network architectures described herein have been shown to improve the state of the art performance of mobile-optimized models on multiple benchmarks across a spectrum of different sizes, while also reducing the amount of memory and processing resources required for implementation.

More particularly, neural networks have revolutionized many areas of machine intelligence, enabling superhuman accuracy for challenging image recognition tasks. However, the drive to improve accuracy often comes at a cost: modern state of the art networks require high computational resources beyond the capabilities of many mobile and embedded applications.

In contrast, the present disclosure introduces new, more efficient neural network architectures that are especially beneficial for mobile and resource constrained environments. The networks described herein push the state of the art for mobile tailored computer vision models, by significantly decreasing the number of operations and memory needed while retaining the same accuracy.

According to one aspect of the present disclosure, a neural network can include one or more convolutional blocks. The term "block" generally refers to a defined structure of one or more layers within a network and can also be referred to as a module or a subnetwork. Each convolutional block can include a linear bottleneck layer and one or more convolutional layers. The convolutional layer(s) can perform non-linear transformation(s). Thus, in contrast to certain existing network structures which rely solely on non-linear layers, certain implementations of the present disclosure can include a bottleneck layer that performs a linear transformation on its input data.

In some implementations, the one or more convolutional layers can be or include one or more separable convolutional layers. For example, each separable convolutional layer can be configured to separately apply both a depthwise convolution and a pointwise convolution during processing of an input.

According to another aspect of the present disclosure, the linear bottleneck layer can operate or otherwise represent data in a first dimensional space, while the one or more convolutional layers (e.g., separable convolutional layers) can operate or otherwise represent data in a second dimensional space, where the second dimensional space includes a larger number of dimensions. As examples, the linear bottleneck layer can represent data in a first tensor, while the one or more convolutional layers can represent data one or more a second tensors, where each of the one or more second tensors includes a larger Euclidean space than the first tensor. Thus, the linear bottleneck layer can be configured to operate (e.g., perform a linear transformation) in a low dimensional space while the one or more convolutional layers are configured to operate (e.g., perform one or more non-linear transformations) in a high dimensional space. As such, the convolutional layers can, in some instances, be referred to as "expansion convolutional layers".

This dimensional structure enables a natural separation between the input and output domains of the convolutional blocks. This allows a decoupling of the input/output domains from the expressiveness of the transformation, which provides a convenient framework for analysis. In particular, this dimensional structure can enable a natural separation between the input/output domain of the building blocks (e.g., bottleneck layers) and the layer transformation—that is a non-linear function that converts input to the output. The former can be seen as the capacity of the network at each layer, whereas the latter as the expressiveness. This is in contrast with traditional convolutional network structures, where both expressiveness and capacity are tangled together and are functions of the output's layers depth.

Further, due to this alternating dimensional structure, in some instances the convolutional blocks can be referred to as "mixed-linearity convolutional blocks" and/or "alternating-linearity convolutional blocks."

In some implementations, a neural network can include a plurality of the convolutional blocks that are stacked one after another. Thus, in some implementations, the linear bottleneck layer of a particular convolutional block can take as input (e.g., perform a linear transformation on) the output of the convolutional layers of a previous convolutional block (e.g., the previous sequential convolutional block).

Thus, in a stacked configuration, a neural network can include a number of linear bottleneck layers interleaved with a number of non-linear convolutional layers (e.g., separable convolutional layers). As such, depending on how the convolutional blocks are defined, the linear bottleneck layer for each block can be positioned structurally prior to or after the corresponding convolutional layer(s) for such block.

Another main contribution of the present disclosure is a novel layer module: the inverted residual block with linear bottleneck. The inverted residual block can be similar to the convolutional block described above, but can further include the passing of residual information between layers (e.g., between linear bottleneck layers) via a residual shortcut connection.

In some implementations, the inverted residual block can include a one or more convolutional layers configured to provide a first output and a linear bottleneck layer configured to receive the first output and generate a second output. In addition, the linear bottleneck layer can be further configured to receive a residual and add the residual to the second output to provide a third output.

As one example, the linear bottleneck layer can receive the residual from the linear bottleneck layer of a previous inverted residual block (e.g., the previous sequential inverted residual block). More particularly, in some implementations, a plurality of inverted residual blocks can be stacked one after the other and each inverted residual block can include a linear bottleneck layer that receives a residual from the linear bottleneck layer from a previous block (e.g., the previous sequential block) and/or provides a residual to the linear bottleneck layer of a subsequent block (e.g., the next sequential block). For example, the residuals can be provided via respective residual shortcut connections. In another example, the linear bottleneck layer for an inverted residual block (e.g., an initial inverted residual block of the network) can receive the residual from an initial linear bottleneck layer structurally positioned prior to the one or more convolutional layers of such at least one inverted residual block.

As described above, the linear bottleneck layer(s) can be configured to operate in a lower dimensional space than the convolutional layers. Thus, in one example, the inverted residual block can take as input a low dimensional compressed representation which is first expanded to high dimension and filtered with convolutional layer(s) (e.g., light weight depthwise convolution(s)). Features can be subsequently projected back to a low dimensional representation with a linear convolution.

Similar to the convolutional blocks, the dimensional structure of the inverted residual blocks enables a natural separation between the input and output domains of the convolutional blocks (e.g., the capacity of the blocks) and the layer transformation of the blocks (e.g., the expressiveness of the blocks). This allows a decoupling of the input/output domains from the expressiveness of the transformation, which provides a convenient framework for analysis.

The present disclosure provides a number of technical effects and benefits. As one example technical effect and benefit, the neural network structures provided by the present disclosure can be efficiently implemented using standard operations in any modern framework. As one example technical effect and benefit, the neural network structures provided by the present disclosure have been demonstrated to achieve or beat state of the art networks along multiple performance points using standard benchmarks. Thus, the present disclosure represents an advance in the performance of the networks themselves.

Further, the convolutional block designs described herein are particularly suitable for mobile designs. In particular, as another example technical effect and benefit, the neural network structures of the present disclosure significantly reduce the memory footprint needed during inference because they never fully materialize large intermediate tensors. This reduces the need for main memory access in many modern devices (e.g., embedded hardware designs) that provide small amounts of extremely fast memory (e.g., very fast software-controlled cache memory). Reducing the number of access and/or compute operations required also improves the speed at which inference can be performed while reducing the number of processing resources consumed. Thus, in addition to an advance in the performance of the networks themselves, the present disclosure provides significant improvements which reduce memory and processing resource usage, thereby improving inference speed.

With reference now to the Figures, example embodiments of the present disclosure will be discussed in further detail.

2. Example Devices and Systems

FIG. 1A depicts a block diagram of one example computing system 100 that can implement the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some implementations, the device 102 is not necessarily a device associated with a user but instead can be any arbitrary mobile or embedded device or system.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120. For example, the machine-learned models 120 can be or can otherwise include various machine-learned models such as neural networks (e.g., deep neural networks) or other multi-layer linear and/or non-linear models. Neural networks can include recurrent neural networks (e.g., long short-term memory recurrent neural networks), feed-forward neural networks, convolutional neural networks (e.g., MobileNets) or other forms of neural networks.

In some implementations, the one or more machine-learned models 120 can be received from the server computing system 130 over network 180, stored in the user computing device memory 114, and the used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can train the machine-learned models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train a machine-learned model 140 based on a set of training data 142.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the communication assistance models 120 can be both trained and used locally at the user computing device 102. In some of such implementations, the user computing device 102 can implement the model trainer 160 to personalize the communication assistance models 120 based on user-specific data.

Figure 1B:
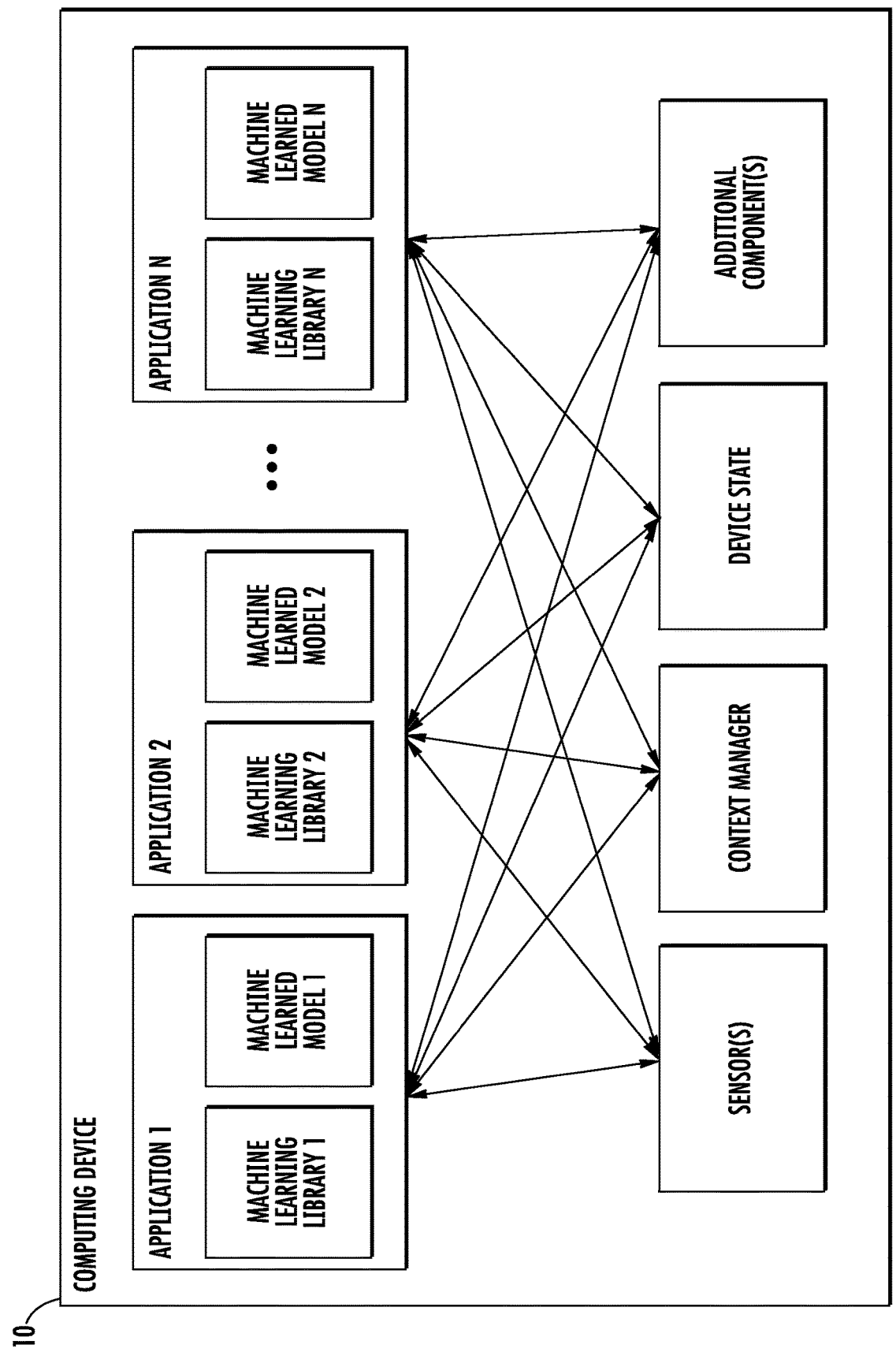
FIG. 1B depicts a block diagram of an example computing device according to example embodiments of the present disclosure.

FIG. 1B depicts a block diagram of an example computing device 10 that performs communication assistance according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned communication assistance model. Example applications include a text messaging application, an email application, a browser application, a photograph storage and management application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
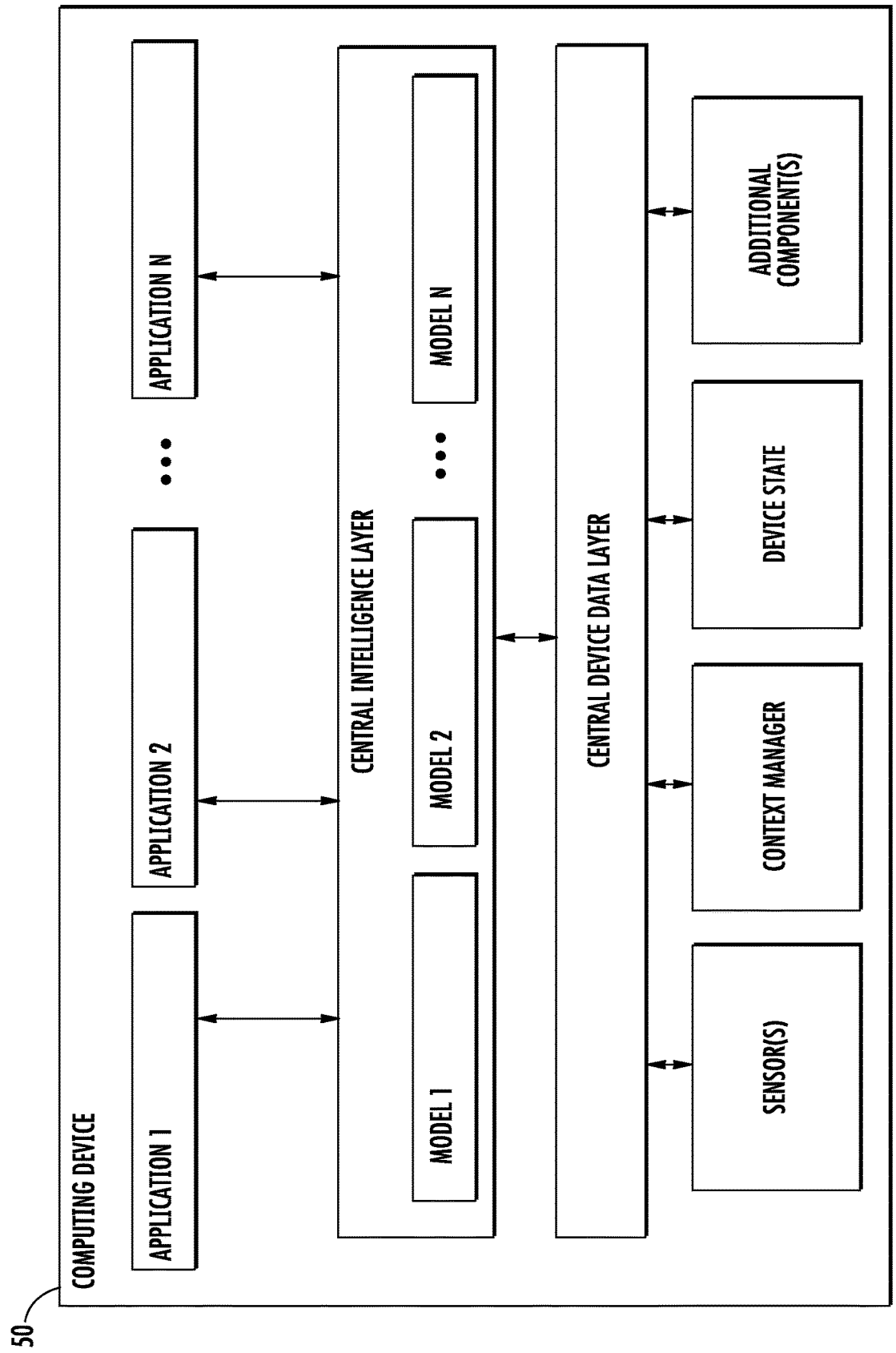
FIG. 1C depicts a block diagram of an example computing device according to example embodiments of the present disclosure.

FIG. 1C depicts a block diagram of an example computing device 50 that performs communication assistance according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a photograph storage and management application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a communication assistance model) can be provided for each application and managed by the central intelligence layer. In other implementations, two or more applications can share a single machine-learned model. For example, in some implementations, the central intelligence layer can provide a single model (e.g., a single communication assistance model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

3. Example Network Structures

3.1 Example Depthwise Separable Convolutions

Depthwise separable convolutions can be a key building block for building efficient neural networks. The basic idea is to replace a full convolutional operator with a factorized version that splits convolution into two separate layers. In some implementations, the first layer is called a depthwise convolution and applies lightweight filtering by applying a single convolutional filter per input channel. In such implementations, the second layer is a 1×1 convolution, called a pointwise convolution, which is responsible for building new features through computing linear combinations of the input channels. Thus, in some implementations, the depthwise convolution applies a single filter to each input channel. The pointwise convolution then applies a 1×1 convolution to combine the outputs the depthwise convolution.

Figure 2A:
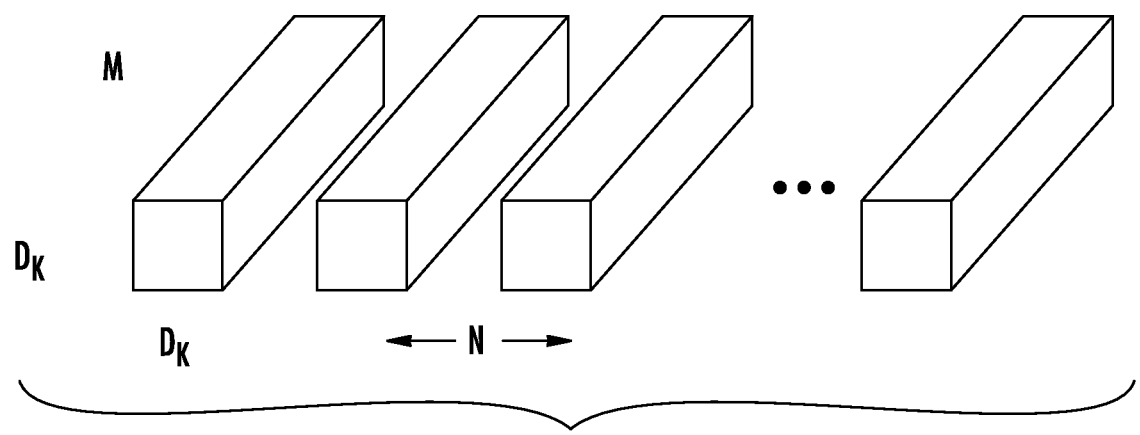
FIG. 2A depicts a graphical diagram of example standard convolution filters according to example embodiments of the present disclosure.
Figure 2B:
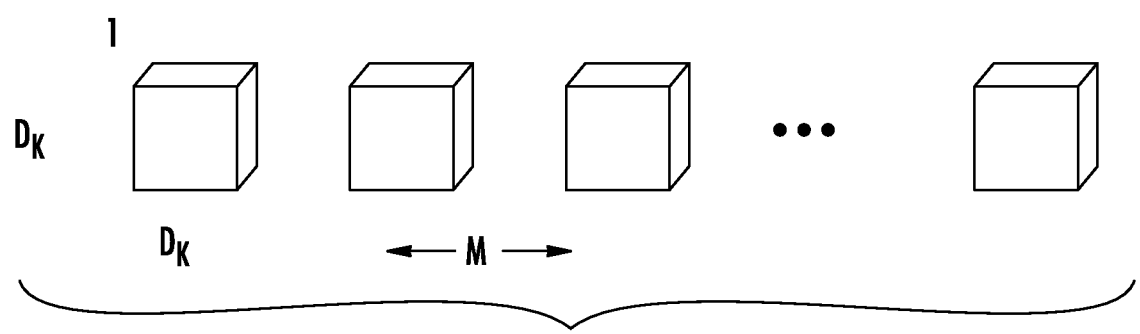
FIG. 2B depicts a graphical diagram of example depthwise convolutional filters according to example embodiments of the present disclosure.
Figure 2C:
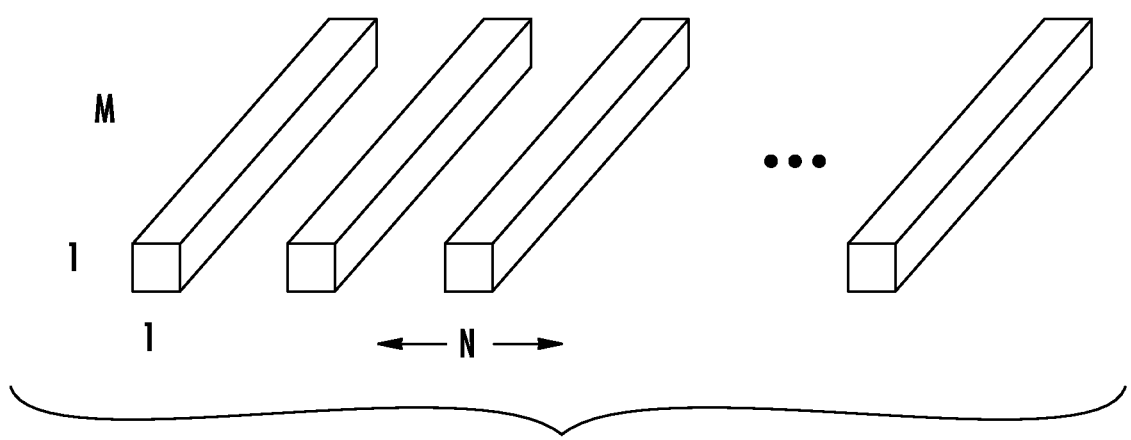
FIG. 2C depicts a graphical diagram of example pointwise convolutional filters according to example embodiments of the present disclosure.

FIGS. 2A-C show how a standard convolution (FIG. 2A) can be factorized into a depthwise convolution (FIG. 2B) and a 1×1 pointwise convolution (FIG. 2C).

A standard convolution both filters and combines inputs into a new set of outputs in one step. The depthwise separable convolution splits this into two layers, a separate layer for filtering and a separate layer for combining. This factorization has the effect of drastically reducing computation and model size.

In particular, a standard convolution can take an $h_i \times w_i \times d_i$ input tensor $L_i$ and apply a convolutional kernel $K \in \mathbb{R}^{k \times k \times d_i \times d_j}$ to produce $L_j$ an $h_i \times w_i \times d_j$ output tensor. Standard convolutional layers have the computational cost of:

$$h_i \cdot w_i \cdot d_i \cdot d_j \cdot k \cdot k \qquad (1)$$

where the computational cost depends multiplicatively on all of the terms.

Depthwise separable convolutions can be a drop in replacement for standard convolutional layers but only cost:

$$h_i \cdot w_i \cdot d_i \cdot k \cdot k + h_i \cdot w_i \cdot d_i \cdot d_j \qquad (2)$$

which is the sum of the depthwise and 1×1 pointwise convolutions.

Depthwise separable convolution reduces computation compared to traditional computation layers by a factor of:

$$\frac{1}{d_j} + \frac{1}{k^2} \qquad (3)$$

In some example implementations of the neural network structures of the present disclosure, a convolutional neural network can use k=3 (3×3 depthwise separable convolutions) so the computational cost is 8 to 9 times less than standard convolutions at only a small reduction in accuracy.

3.2 Example Discussion of Linear Bottlenecks

Consider a deep neural network consisting of n layers. Looking at layer $L_i$, such layer has an activation tensor of dimensions $h_i \times w_i \times d_i$. Throughout this section, the basic properties of these activation tensors will be discussed, which will be treated as containers of $h_i \times w_i$ "pixels" with $d_i$ dimensions. Informally for layer i its "manifold of interest" will refer to the set of observable high-dimensional pixels, when the input is a real image. Obviously, such a manifold is not directly expressible, but various properties of it can be empirically studied. For example, it has been assumed that such manifolds of interest in neural networks could be embedded in a low-dimensional subspace. In other words, when one looks at all individual d-channel pixels of a deep convolutional layer, the information encoded in those values actually lie in some manifold, which in turn is embeddable into a low-dimensional subspace. Note, however, that dimensionality of the manifold differs from the dimensionality of a subspace that could be embedded via linear transformation.

At a first glance, such a fact could then be captured and exploited by simply reducing the dimensionality of a layer by reducing the dimensionality of the operating space. However, this intuition breaks down when it is considered that deep convolutional neural networks actually have non-linear per coordinate transformations, such as relu. For example relu applied to a line in 1-d space results in a 'ray', whereas in $\mathcal{R}^n$ space, for general orientation it results in piece-wise linear curve with n-joints. It can be seen that in general if a result of a layer transformation relu Bx is a non-zero volume S, the points that map to the interior of this set interior S are obtained via a linear transformation B of the input, thus indicating that the part of the input space corresponding to full dimensional output, is limited to linear transformation. In other words, the deep networks only have the power of a linear classifier on the non-zero volume part of the output domain.

This suggests that if the output manifold has non-zero volume part V, the input that maps into V is mapped via a linear transformation. On the other hand, when relu collapses the volume it inevitably loses information. However, it can also be shown that if the input manifold is embeddable into significantly lower dimensional subspace of the enclosing space then the relu transformation generally preserves the information while introducing the much needed complexity into the set of expressible functions.

To summarize, aspects of the present disclosure recognize and leverage two properties that indicate that the manifold of interest should lie in low dimensional subspace of the higher dimensional space. First, the non-zero volume sets after passing through a neural network correspond to a linear transformation. Second, relu is capable of preserving complete information about the input manifold, but only if the input domain lies in low dimensional sub space of the input space.

Aspects of the present disclosure can optimize existing neural architectures based on these principles. Since the manifold of interest is low dimensional, this can be captured by inserting linear bottleneck layers into convolutional blocks. Linear layers can prevent non-linearity from destroying too much information. The ratio between the size of an input bottleneck to the inner size can be referred to as an expansion ratio.

3.3 Example Convolutional Blocks

Figure 3A:
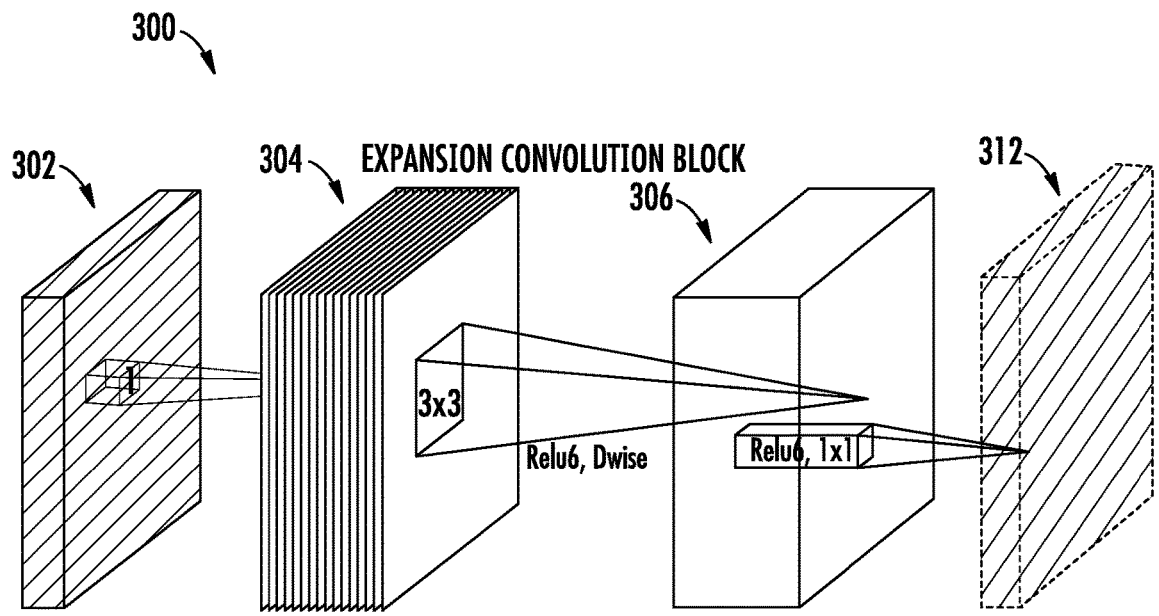
FIGS. 3A and 3B depict graphical diagrams of example convolutional blocks according to example embodiments of the present disclosure.
Figure 3B:
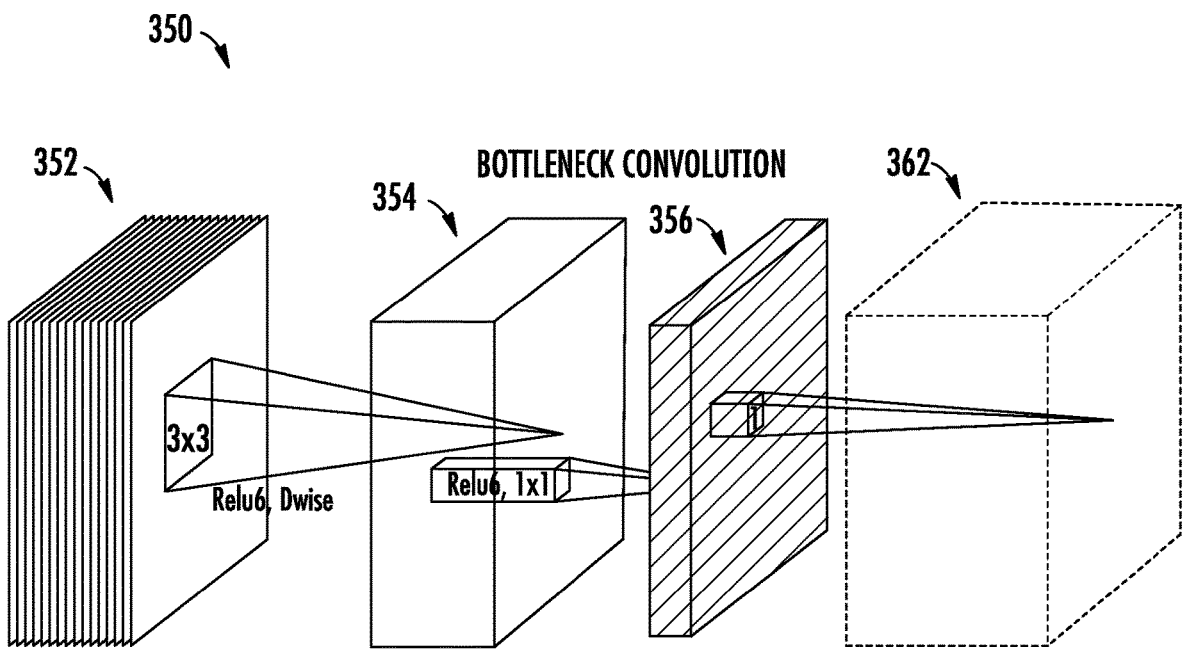

FIGS. 3A and 3B depict graphical diagrams of example convolutional blocks according to example embodiments of the present disclosure.

Referring first to FIG. 3A, a first example convolutional block 300 is depicted. The term "block" generally refers to a defined structure of one or more layers within a network and can also be referred to as a module or a subnetwork. A neural network can include one or more of the convolutional blocks 300. For example, a plurality of the blocks 300 can be stacked one after the other.

The example convolutional block 300 includes a linear bottleneck layer 302 and an expansion convolutional block that includes depthwise convolutional layers 304 and pointwise convolutional layers 306.

According to another aspect of the present disclosure, the linear bottleneck layer 302 can operate or otherwise represent data in a first dimensional space, while the one or more convolutional layers (e.g., separable convolutional layers 304 and 306) can operate or otherwise represent data in a second dimensional space, where the second dimensional space includes a larger number of dimensions. Thus, the linear bottleneck layer 302 can be configured to operate (e.g., perform a linear transformation) in a low dimensional space while the one or more convolutional layers 304 and 306 are configured to operate (e.g., perform one or more non-linear transformations) in a high dimensional space. As such, the convolutional layers 304 and 306 can be referred to as "expansion convolutional layers" or together as an "expansion convolution block".

Thus, in contrast to certain existing network structures which rely solely on non-linear layers, the convolutional block 300 can include a bottleneck layer 302 that performs a linear transformation on its input data.

This dimensional structure enables a natural separation between the input and output domains of the convolutional blocks. This allows a decoupling of the input/output domains from the expressiveness of the transformation, which provides a convenient framework for analysis. Further, due to this alternating dimensional structure, in some instances the convolutional blocks can be referred to as "mixed-linearity convolutional blocks" and/or "alternating-linearity convolutional blocks."

Following the pointwise convolutional layers 306 is a second linear bottleneck layer 312. As one example, in some implementations, the second linear bottleneck layer 312 can be the linear bottleneck layer of a subsequent iteration of the convolutional block 300. For example, this relationship (i.e., that the layer 312 belongs to a subsequent block) is denoted by the lighter shading applied in the layer 312 in FIG. 3A. This convention of lighter shading denoting that the lighter shaded layer belongs to a subsequent block is continued throughout the Figures.

Thus, in some implementations, the linear bottleneck layer (e.g., 312) of a subsequent convolutional block can take as input (e.g., perform a linear transformation on) the output of the convolutional layers (e.g., 304 and 306) of a previous convolutional block (e.g., block 300).

Thus, in a stacked configuration, a neural network can include a number of linear bottleneck layers interleaved with a number of non-linear convolutional layers (e.g., separable convolutional layers). As such, depending on how the convolutional blocks are defined, the linear bottleneck layer for each block can be positioned structurally prior to or after the corresponding convolutional layer(s) for such block.

For example, by changing the convention by which the blocks are defined, the ordering of the linear bottleneck layer and the convolutional layer(s) can be switched. For example, FIG. 3B illustrates this principle.

FIG. 3B depicts a graphical diagram of another example convolutional block 350. The convolutional block 350 includes depthwise convolutional layers 352 and pointwise convolutional layers 354. The layers 352 and 354 can operate similar to the layers 304 and 306 described above with reference to FIG. 3A.

Referring still to FIG. 3B, following the convolutional layers 352 and 354 is a linear bottleneck layer 356. The linear bottleneck layer 356 can operate similar to the layers 302 and/or 312 described above with reference to FIG. 3A.

Referring still to FIG. 3B, following the linear bottleneck layer 356 are one or more additional convolutional layers 362. For example, the additional convolutional layers 362 can be separable convolutional layers such that one or more additional depthwise convolutional layers immediately follow the linear bottleneck layer 356.

Thus, referring to both FIGS. 3A and 3B, it can be seen that example convolutional blocks can include linear bottleneck layers positioned structurally prior to and/or after one or more convolutional layers (e.g., convolutional layers such as separable convolutional layers that perform non-linear transformations). In fact, in practice, the example blocks 300 and 350 are equivalent when respectively placed into a stacked configuration. In some implementations, an initial and/or a final block in the stack can include two linear bottleneck layers.

Figure 5A:
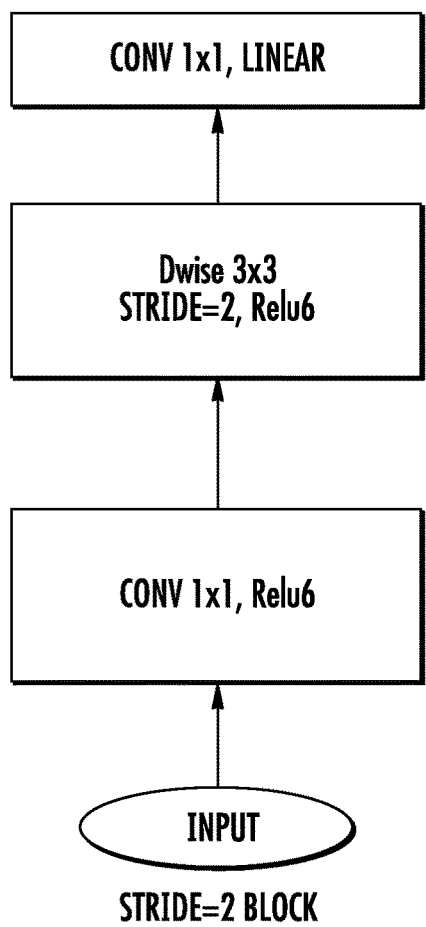
FIG. 5A depicts a flow diagram of an example convolutional block according to example embodiments of the present disclosure.

As another example, FIG. 5A depicts a flow diagram of another example convolutional block according to example embodiments of the present disclosure.

3.4 Example Inverted Residual Blocks

Figure 4:
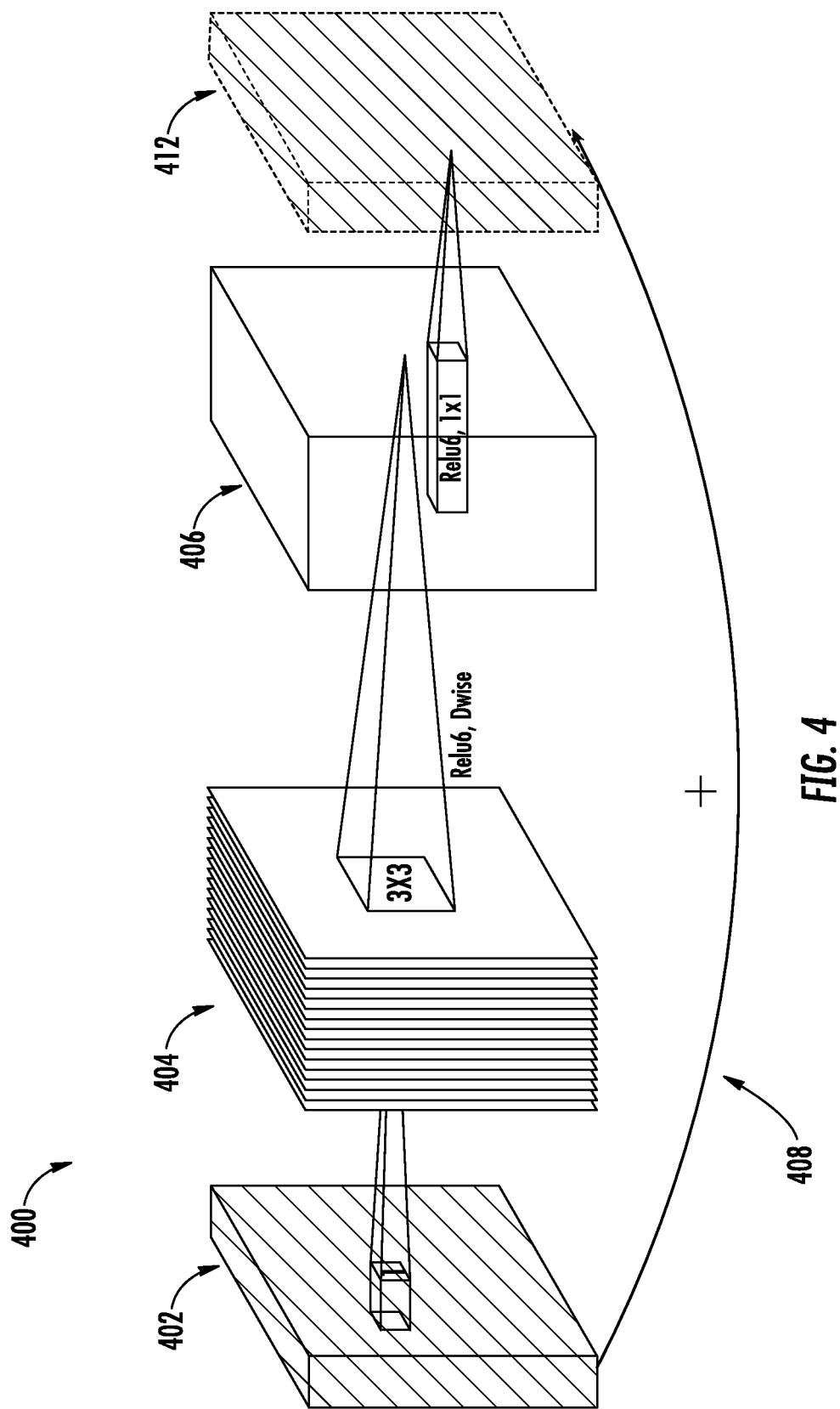
FIG. 4 depicts a graphical diagram of an example inverted residual block according to example embodiments of the present disclosure.

FIG. 4 depicts a graphical diagram of an example inverted residual block 400 according to example embodiments of the present disclosure. The inverted residual block 400 can be similar to the convolutional blocks 300 and 350 described above, but can further include the passing of residual information between layers (e.g., between linear bottleneck layers 402 and 412) via a residual shortcut connection 408.

More particularly, the example inverted residual block 400 can include a linear bottleneck layer 402. Following the linear bottleneck layer 402, the block 400 can further include one or more convolutional layers. For example, as illustrated in FIG. 4, the block 400 can further include a plurality of depthwise convolutional layers 404 and a plurality of pointwise convolutional layers 406. For example, these layers 404 and 406 can be referred to as expansion convolutional layers or an expansion convolution block.

A second linear bottleneck layer 412 can follow the convolutional layers 404 and 406. As one example, in some implementations, the second linear bottleneck layer 312 can be the linear bottleneck layer of a subsequent iteration of the inverted residual block 400.

Thus, in some implementations, the linear bottleneck layer (e.g., 412) of a subsequent inverted residual block can take as input (e.g., perform a linear transformation on) the output of the convolutional layers (e.g., 404 and 406) of a previous convolutional block (e.g., block 400).

Furthermore, according to an aspect of the present disclosure, the linear bottleneck layer 402 can be configured to provide a residual to the second linear bottleneck layer 412 via a residual shortcut connection 408. The second linear bottleneck layer 412 can be configured to add the residual to the output it generates by transforming the output of the pointwise convolutional layers 406. This pattern can be repeatable. That is, similar to layer 412, the linear bottleneck layer 402 can receive a residual from a previous linear bottleneck layer of a previous inverted residual block (e.g., the previous sequential inverted residual block) (not shown). Likewise, the linear bottleneck layer 412 can itself provide a residual to the linear bottleneck layer of a subsequent block (e.g., the next sequential block) (not shown).

One motivation for inserting shortcuts is similar to that of classical residual connections: to improve the ability of a gradient to propagate across multiple layers. However, the inverted design is considerably more memory efficient, as well as providing improved performance.

Furthermore, in the networks described herein, layers are removable. For example, a convolutional block (e.g., an inverted residual block) can be removed and the rest of the network can be rewired, without requiring any retraining, with only a modest cost to the accuracy.

Figure 5B:
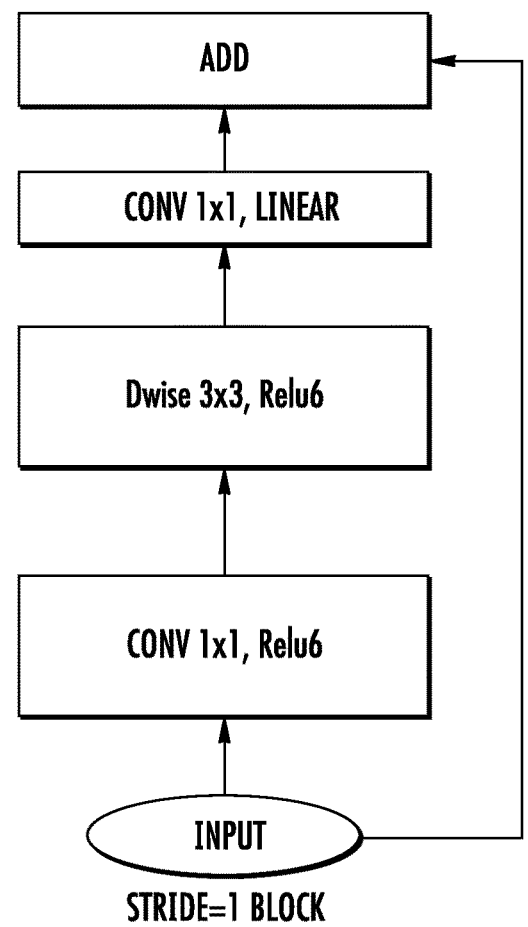
FIG. 5B depicts a flow diagram of an example inverted residual block according to example embodiments of the present disclosure.

As another example, FIG. 5B depicts a flow diagram of another example inverted residual block according to example embodiments of the present disclosure.

Particular layer, filter, or kernel sizes illustrated in FIGS. 3A-B, 4, and 5A-B are provided as examples only.

4. Example Network Implementations

The example architecture of one example model implementation (referred to as "MobileNet V2") will now be described in detail. This example is provided of one example of a possible implementation of aspects of the present disclosure. The present disclosure is not limited by or to the example implementation.

As described in the previous sections, the basic building block can be bottleneck depth-separable convolutions with residuals. The architecture of Mobilenet V2 can contain the initial fully convolution layer with 32 filters, followed by 19 residual bottleneck layers as listed in the Table 2. Relu6 can be used as the source of non-linearity, because of its robustness properties when used with low-precision computation. Kernel size 3×3 can be used, as is standard for modern network. During training, dropout and batch normalization can be utilized.

With the exception of first layer, the example architecture can use constant expansion rate throughout the network. Expansion rates between 5 and 10 result in nearly identical performance curve, with smaller networks being better off with slightly smaller expansion rates and larger networks having slightly better performance with larger expansion rates.

In some example experiments performed on example implementations of the present disclosure, an expansion factor of 6 was consistently applied to the size of the input tensor. For example for a bottleneck layer that takes 64-channel input tensor and produces a tensor of size 128 channels, the intermediate expansion layer is then 64*6=384 channels.

TABLE 1

Bottleneck residual block transforming from k to k' channels, with stride s, and expansion factor t.

| Input | Operator | Output |
|---|---|---|
| h × w × k | 1 × 1 conv2d + relu6 | h × w × (tk) |
| h × w × tk | 3 × 3 dwise with stride = s, + relu6 | h/s × w/s × (tk) |
| h/s × w/s × tk | linear 1 × 1 conv2d | h/s × w/s × k' |

TABLE 2

Example Mobilenet V2 architecture. Each line describes a sequence of 1 or more identical (modulo stride) layers, according to # of reps. The last layer in each block can have stride 1 or 2. Fewer stride 2 blocks can be used to preserve layout of internal tensors. The expansion can be consistently applied to the input tensor.

| Input | Operator | Exp factor | #output channels | # reps | first stride |
|---|---|---|---|---|---|
| 224 × 224 × 3 | conv2d, 3 × 3 | — | 32 | 1 | 2 |
| 112 × 112 × 32 | bottleneck residual, 3 × 3, | 1 | 16 | 1 | 1 |
| 112 × 112 × 16 | bottleneck residual, 3 × 3 | 6 | 24 | 2 | 2 |
| 56 × 56 × 24 | bottleneck residual, 3 × 3 | 6 | 32 | 3 | 2 |
| 28 × 28 × 32 | bottleneck residual, 3 × 3 | 6 | 64 | 4 | 2 |
| 28 × 28 × 64 | bottleneck residual, 3 × 3 | 6 | 96 | 3 | 1 |
| 14 × 14 × 96 | bottleneck residual, 3 × 3 | 6 | 160 | 3 | 2 |
| 7 × 7 × 160 | bottleneck residual, 3 × 3 | 6 | 320 | 1 | 1 |
| 7 × 7 × 320 | conv2d 1 × 1 | — | 1280 | 1 | 1 |
| 7 × 7 × 1280 | avgpool, 7 × 7 | — | — | 1 | — |
| 1 × 1 × k | eonv2d, 1 × 1 | — | k | — | |

Trade-off hyper parameters: The architecture can be tailored to different performance points, by using the input image resolution and width multiplier as tunable hyper parameters that can be adjusted depending on desired accuracy/performance trade-offs. One example network (multiplier 1, 224×224), has computational cost 300 million multiply-adds and uses 3.4 million parameters. The performance trade-offs were explored for input resolutions from 96 to 224, and width multipliers of 0.35 to 1.5. The network computational cost ranges from 7 multiply adds to 920- Multiply adds, while the model size vary between 1.7M and 5.3M. For multipliers less than one, the width multiplier can be applied to all layers except the very last convolutional layer. This improves performance for smaller models.

5. Example Implementation Notes 5.1 Example Memory Efficient Inference

The inverted residual bottleneck layers allow a particularly memory efficient implementation which is very important for mobile applications. A standard efficient implementation of inference that uses for instance Tensorflow or Caffe, can build a directed acyclic compute hypergraph G, consisting of edges representing the operations and nodes representing tensors of intermediate computation. The computation is scheduled in order to minimize the total number of tensors that needs to be stored in memory. In a most general case it searches over all plausible computation orders $\Sigma(G)$ and picks the one that minimizes:

$$M(G) = \min_{\pi \in \Sigma(G)} \max_{i \in 1...n} \left[ \sum_{A \in R(i,\pi,G)} |A| \right] + \text{size}(\pi_i).$$

where $R(i,\pi,G)$ is the list of intermediate tensors that are connected to any of $\pi_i \ldots \pi_n$ nodes, $|A|$ represents the size of node $|A|$ and $\text{size}(i)$ is the total amount of memory needed for internal storage during operation i.

For graphs that have only trivial parallel structure (such as residual connection), there is only one non-trivial feasible computation order, and thus the total amount and a bound on the memory needed for inference on compute graph G can be simplified:

$$M(G) = \max_{op \in G} \left[ \sum_{A \in op_{inp}} |A| + \sum_{B \in op_{out}} |B| + |op| \right]$$

Stated differently, the amount of memory is then simply the maximum total size of combined inputs and outputs across all tensors. In what follows, it is shown that if the bottleneck residual block is treated as a single operation (and inner convolution is treated as disposable tensor), the total amount of memory then would be dominated by the size of bottleneck tensors, rather than the size of tensors that are internal to bottleneck (and much larger).

Bottleneck Residual Block: In some implementations, a bottleneck block operator $F(x)$ can be expressed as a composition of three operators $F(x)=[A \cdot \mathcal{N} \cdot B]x$, where A is a linear transformation A: $R^{s \times s \times k} \to R^{s \times s \times n}$, $\mathcal{N}$ is a non-linear per channel transformation: $\mathcal{N}: R^{s \times s \times n} \to R^{s' \times s' \times n}$, and B is again a linear transformation to the output domain: B: $R^{s' \times s' \times n} \to R^{s' \times s' \times k'}$.

For certain example implementations of the aspects described herein, $\mathcal{N}$ =relu6·dwise·relu6 x, but the results apply to any per-channel transformation. Suppose the size of the input domain is $|x|$ and the size of the output domain is $|y|$, then $F(X)$ can use only $|s^2k|+|s'^2k'|+O(\max(s^2, s'^2))$ memory.

Example algorithms can be based on the fact that the inner tensor I can be represented as concatenation of t tensors, of size n/t each and the function can then be represented as:

$$F(x) = \sum_{i=1}^{t} (A_i \cdot N \cdot B_i)(x)$$

By accumulating the sum, only one intermediate block of size n/t is required to be kept in memory at all times. Using n=t, one can end up having to keep only a single channel of the intermediate representation at all times. The two constraints that enabled use of this trick are: (a) the fact that the inner transformation (which can include non-linearity and depthwise) is per channel, and (b) the consecutive non-per channel operators have significant ratio of the input size to the output. For most of the traditional neural networks, such trick would not produce a significant improvement.

Note that the number of multiply-adds operators needed to compute F(X) using t-way split is independent of t, however in existing implementations it was found that replacing one matrix multiplication with several smaller ones hurts run-time performance due to increased cache misses. This approach was found to be the most helpful when used with t being a small constant between 2 and 5, which significantly reduces the memory requirement and still allows utilization of most of the efficiencies gained by using highly optimized matrix multiplication and convolution operators provided by deep learning frameworks. Special framework level optimization may lead to further run-time improvements.

6. Example Applications and Experiments

The networks and network structures described by the present disclosure can be used to solve a number of different problems or applied to a number of different tasks. Example experiments of example implementations of aspects of the present disclosure are provided below. These are provided as examples only. The present disclosure is not limited to or by these examples.

6.1 ImageNet Classification

As one example, a convolutional neural network that includes one or more of the structures described herein can be trained to perform image classification.

Example training setup: Training can be performed using Tensorflow. Standard RMSPropOptimizer with both decay and momentum set to 0.9 can be used. Batch normalization can be used after every layer, and the standard weight decay can be set to 0.00004. An initial learning rate of 0.045 can be used with a learning rate decay rate of 0.98 per epoch. Training can be performed by 16 GPU asynchronous workers, and a batch size of 96.

Example Results: Example networks of the present disclosure were compared against MobileNetV1, ShuffleNet and NASNet-A models. For ShuffleNet, see Zhang et al., Sufflenet: An extremely efficient convolutional neural network for mobile devices. *CoRR*, abs/1707.01083, 2017. For NASNet-A, see Zoph et al., Learning Transferable architectures for scalable image recognition. *CoRR*, abs/1707.07012, 2017.

Figure 6:
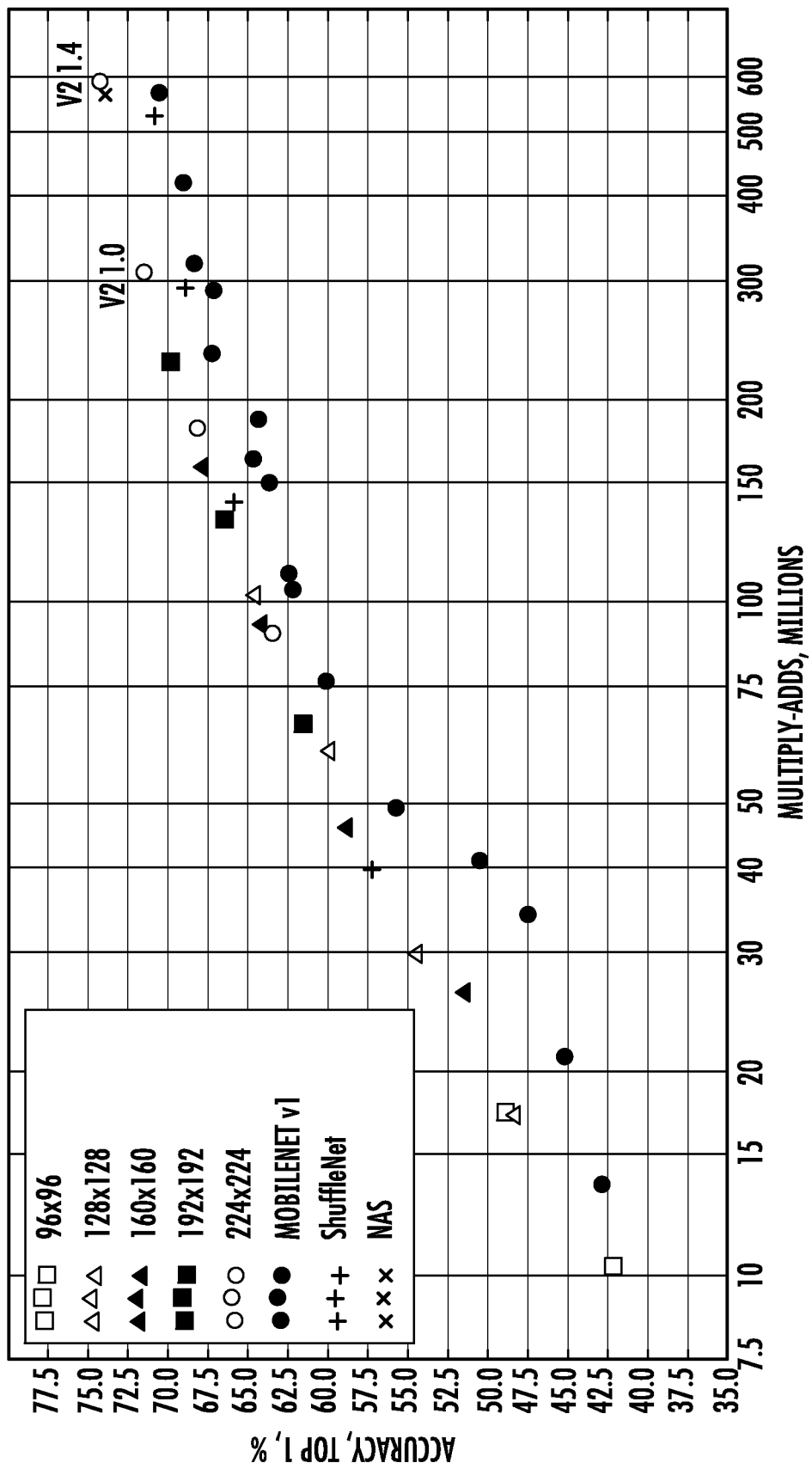
FIG. 6 depicts example experimental results for example embodiments of the present disclosure.

The statistics of a few selected models are provided in Table 4 with the full performance graph in FIG. 6. In particular, FIG. 6 shows performance curve of MobileNetV2 vs MobileNetV1, SuffleNet, and NAS. For all the MobileNetV2 networks, the multipliers 0.35, 0.5, 0.75, and 1.0 were used for all resolutions and an addition 1.4 for 224.

TABLE 4

Performance on ImageNet, comparison for different networks. As is common practice for ops, the total number Multiply-Adds is counted. In the last column, running time in ms is reported, for running these networks on a single large core of Pixel Phone, using proprietary optimized Tensorflow. ShuffleNet numbers are not reported as the framework does not yet support efficient group convolutions.

| Network | Top 1 | Params | MAdds (M) | CPU ms |
|---|---|---|---|---|
| MobileNetV1 | 70.8 | 4.2M | 575 | 123 |
| ShuffleNet (1.5) | 69.0 | 2.9M | 292 | — |
| ShuffleNet (x2) | 70.9 | 4.4M | 524 | — |
| NasNet-A | 74.0 | 5.3M | 564 | 192 |
| MobileNetV2 | 71.5 | 3.4M | 300 | 80 |
| MobileNetV2 (1.4) | 74.3 | 6.9M | 585 | 149 |

6.2 Example Object Detection

As another example, a convolutional neural network that includes one or more of the structures described herein can be trained to perform object detection. For example, the Single Shot Detector (SSD) model can be modified to form a mobile-friendly variant, which can be referred to as "SSDLite". In particular, all the regular convolutions can be replaced with separable convolutions (e.g., depthwise followed by 1×1 projection) in SSD prediction layers. This design is in line with the overall design of MobileNets and shown to be much more computationally efficient. Compared to regular SSD, SSDLite dramatically reduces both parameter count and computational cost, as shown in Table 5 below.

TABLE 5

Comparison of size and computational cost between SSD and SSDLite configured with MobilenetV2 and predicting 80 classes.

| | Params (M) | MAdd (B) |
|---|---|---|
| SSD | 14.8 | 1.25 |
| SSDLite | 2.1 | 0.35 |

The performance of MobileNetV2 and V1 as feature extractors for object detection was compared with a modified version of Single Shot Detector (SSD) on COCO dataset. These were also compared to YOLOv2 and original SSD (with VGG-16 as base network) as baselines.

For MobileNetV2, the first layer of SSDLite was attached to the intermediate expand layer of layer 15 (with output stride of 16), the second and rest of SSDLite layers were attached on top of the last layer (with output stride of 32). This setup is consistent with MobileNet V1 as the first and second layers were attached to base network feature map of same output strides.

Both MobileNet models were trained and evaluated with Open Source Tensorflow Object Detection API. The input resolution of both models was 320×320. Both mAP (COCO challenge metrics), number of parameters, and number of Multiply-Adds were benchmarked and compared. The results are shown in Table 6. MobileNetV2 SSDLite is not only the most efficient model but also the most accurate of the three. Notably, MobileNetV2 SSDLite is 20× more efficient and 10× smaller while still outperforms YOLOv2 on COCO dataset.

TABLE 6

Performance comparison of MobileNetV2 + SSDLite and other realtime detectors on COCO dataset object detection task. MobileNetV2 + SSDLite achieves competitive accuracy with significantly less parameters and computational complexity. All models are trained on trainval35k and evaluated on test-dev.

| Network | mAP | Params | MAdd |
|---|---|---|---|
| SSD300 | 23.2 | 36.1M | 35.2B |
| SSD512 | 26.8 | 36.1M | 99.5B |
| YOLOv2 | 21.6 | 50.7M | 17.5B |
| MNet V1 + SSDLite | 22.2 | 5.1M | 1.3B |
| MNet V2 + SSDLite | 22.1 | 4.3M | 0.8B |

6.3 Example Semantic Segmentation

As yet another example, a convolutional neural network that includes one or more of the structures described herein can be trained to perform semantic segmentation. For example, the MobileNet architecture can be employed as a feature extractor with DeepLabv3 (see Liang-Chieh Chen et al., Rethinking atrous convolution for semantic image segmentation. *CoRR*, abs/1706.05587, 2017).

In particular, MobileNet can be employed as feature extractor with DeepLabv3 for the task of semantic segmentation. DeepLabv3 adopts atrous convolution, a powerful tool to explicitly control the resolution of computed feature maps, and builds five parallel heads including (a) Atrous Spatial Pyramid Pooling module (ASPP) which contains three 3×3 convolution with different atrous rates, (b) 1×1 convolution head, and (c) Image-level features. The ratio of input image spatial resolution to final output resolution is denoted by output_stride, which is controlled by applying the atrous convolution properly. For semantic segmentation, output_stride=16 can be employed; or 8 for denser feature maps. Example experiments were conducted on the PASCAL VOC 2012 dataset, with extra annotated images and evaluation metric mIOU.

Three verticals were mainly experimented with: (1) different feature extractors, (2) simplifying the DeepLabv3 heads for faster computation, and (3) different inference strategies for boosting the performance. The main results are listed in Table 7 below. From the table, it can be observed that (a) the inference strategies, including multi-scale inputs and adding left-right flipped images, significantly increases the FLOPS and thus are not suitable for on-device applications, (b) using output_stride=16 is more efficient than output_stride=8 for less computation, (c) MobileNetV1 is already a powerful feature extractor and only requires about 4.9-5.7 times fewer FLOPS than ResNet-101 (e.g., mIOU: 78.56 vs 82.70, and FLOPS: 1983.80 vs 9741.18), (d) it is more efficient to build DeepLabv3 heads on top of the second last feature map of MobileNetV2 than the original last feature map, since second last feature map contains 320 channels instead of 1280, and by doing so, similar performance can be attained while requiring about 2.5 times fewer FLOPS than MobileNetV1 counterparts, and (e) DeepLabv3 heads are computationally expensive and removing the ASPP module significantly reduces the FLOPS with slight performance degradation. In the end, one candidate for on-device applications is identified in bold face in the table, which attains 75.32% mIOU and only requires 5.5B FLOPS (or 2.75 MAdds).

TABLE 7

MobileNet + DeepLabv3 inference strategy on the PASCAL VOC 2012 validation set. MNet V2*: Second last feature map is used for DeepLabv3 heads, which includes (1) Atrous Spatial Pyramid Pooling (ASPP) module, and (2) 1 × 1 convolution as well as image-pooling feature. OS: output_stride that controls the output resolution of the segmentation map. MF: Multi-scale and left-right flipped inputs during test. All the models have been pretrained on COCO. The potential candidate for on-device applications is shown in bold face. PASCAL images have dimension 512 × 512 and atrous convolution allows us to control output feature resolution without increasing the number of parameters.

| Network | OS | ASPP | MF | mIOU | Params | MAdds |
|---|---|---|---|---|---|---|
| MNet V1 | 16 | ✓ |  | 75.29 | 11.15M | 14.25B |
|  | 8 | ✓ | ✓ | 78.56 | 11.15M | 941.9B |
| MNet V2* | 16 | ✓ |  | 75.70 | 4.52M | 5.8B |
|  | 8 | ✓ | ✓ | 78.42 | 4.52M | 387B |
| MNet V2* | 16 |  |  | 75.32 | 2.11M | 2.75B |
|  | 8 |  | ✓ | 77.33 | 2.11M | 152.6B |
| ResNet-101 | 16 | ✓ |  | 80.49 | 58.16M | 81.0B |
|  | 8 | ✓ | ✓ | 82.70 | 58.16M | 4870.6B |

6.4 Additional Example Experiments

Figure 7A:
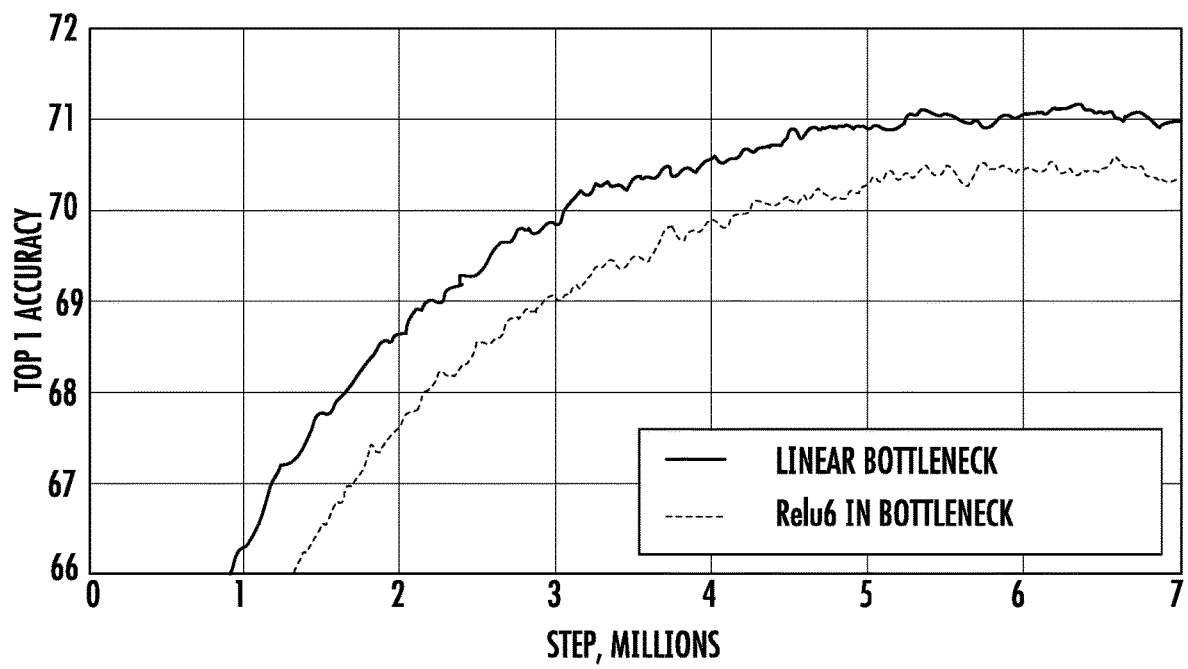
FIGS. 7A and 7B depict example experimental results for example embodiments of the present disclosure.
Figure 7B:
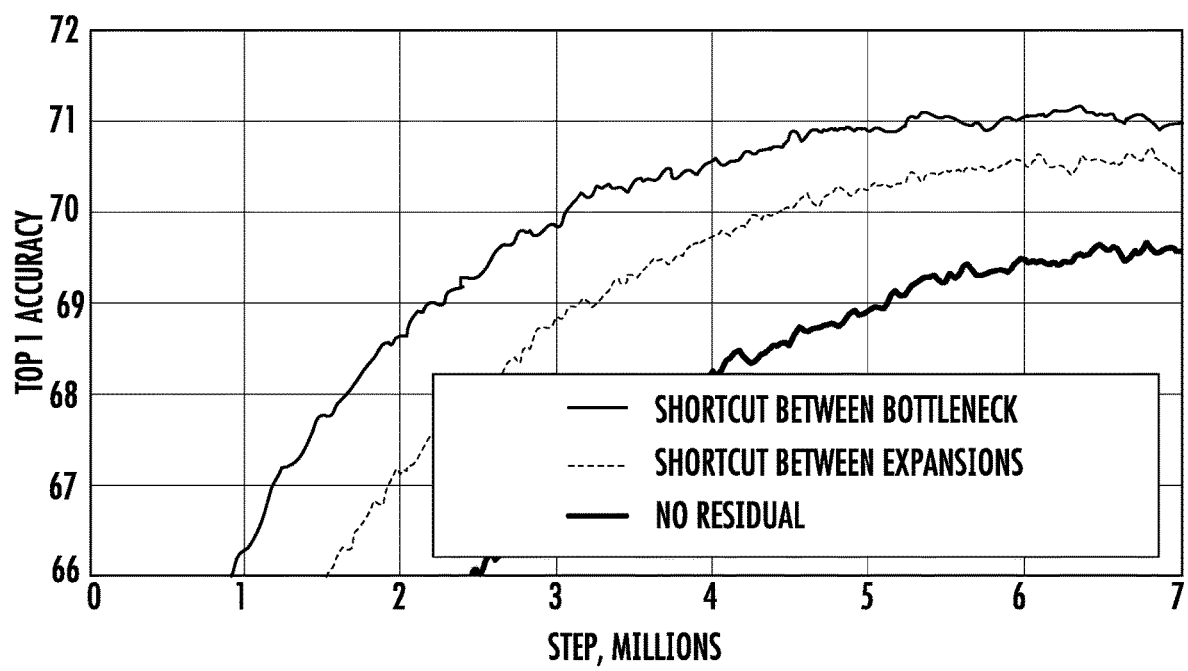

FIGS. 7A and 7B depict additional example experimental results for example embodiments of the present disclosure.

In particular, FIG. 7A illustrates the impact of non-linearity in the bottleneck layer. It has been theoretically presumed that the linear bottleneck models are strictly less powerful that models with non-linearities, because the activations can always operate in the linear regime with appropriate changes to biases and scaling. However, the example experimental results illustrated in FIG. 7A indicate that linear bottleneck in fact improves performance, indicating that non-linearity operator is not beneficial in the bottleneck's low-dimensional space.

FIG. 7B illustrates the impact of variations in residual blocks. In particular, the example experimental results illustrated in FIG. 7B demonstrate that shortcuts connecting bottleneck layers perform better than shortcuts connecting expanded layers.

7. Example Discussion

Aspects of the present disclosure are directed to a new network architecture that enables a family of models that push the state of the art at multiple performance points. A basic building unit—the bottleneck residual block has several properties that make it particularly suitable for mobile applications. It allows very memory-efficient inference and can utilize standard operations present in all neural frameworks.

For the ImageNet dataset, example architectures according to the present disclosure work for models ranging from 10 Million Mult-Adds to 700 Million Mult-Adds, improving on the state of the art. Additionally, the architectures are dramatically simpler than the previous state of the art based on automatic network search.

For object detection task, example networks according to the present disclosure outperformed state-of-art real-time detectors on COCO dataset both in terms of accuracy and model complexity. Notably, the architecture combined with a modified SSD detection module is 20× less computation and 10× less parameters than YOLOv2.

On the theoretical side: the proposed convolutional block has a unique property that allows separation of the network expressivity (encoded by expansion layers) from its capacity (encoded by bottleneck inputs).

8. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
   one or more processors; and
   one or more non-transitory computer-readable media that store a convolutional neural network implemented by the one or more processors, the convolutional neural network comprising:
      one or more inverted residual blocks, each of the one or more inverted residual blocks comprising:
         one or more expansion convolutional layers configured to produce, from an input with an initial number of channels, an expanded representation with an expanded number of channels, the expanded number of channels being larger than the initial number of channels;
         a linear convolutional bottleneck layer downstream of the one or more expansion convolutional layers, the linear convolutional bottleneck layer configured to produce a bottleneck tensor with a reduced number of channels lower than the expanded number of channels; and
         a residual shortcut connection between the linear convolutional bottleneck layer and one or more of:
            a subsequent linear convolutional bottleneck layer of a subsequent inverted residual block of the one or more inverted residual blocks, or
            a previous linear convolutional bottleneck layer of a previous inverted residual block of the one or more inverted residual blocks.

2. The computing system of claim 1, wherein the one or more expansion convolutional layers comprise a spatial convolutional layer that filters the expanded representation, and wherein the linear convolutional bottleneck layer projects the filtered expanded representation to the reduced number of channels.

3. The computing system of claim 2, wherein the one or more expansion convolutional layers comprise one or more separable convolutional layers.

4. The computing system of claim 3, wherein each of the one or more separable convolutional layers is configured to separately apply both a depthwise convolution and a pointwise convolution during processing of an input to such separable convolutional layer to generate a layer output.

5. The computing system of claim 1, wherein the one or more inverted residual blocks comprise a plurality of inverted residual blocks arranged in a stack one after the other.

6. The computing system of claim 1, wherein, for each of the one or more inverted residual blocks, the linear convolutional bottleneck layer is structurally subsequent to the one or more convolutional layers.

7. The computing system of claim 1, wherein the computing system is configured to receive an input image and to generate an output for the input image.

8. The computing system of claim 1, wherein the inverted residual block comprises a residual shortcut connection between the linear convolutional bottleneck layer and the subsequent linear convolutional bottleneck layer of the subsequent inverted residual block.

9. The computing system of claim 1, wherein the inverted residual block comprises a residual shortcut connection between the linear convolutional bottleneck layer and the previous linear convolutional bottleneck layer of the previous inverted residual block.

10. The computing system of claim 8, wherein the subsequent inverted residual block is an immediately subsequent inverted residual block of the one or more inverted residual blocks.

11. The computing system of claim 9, wherein the previous inverted residual block is an immediately previous inverted residual block of the one or more inverted residual blocks.

12. One or more non-transitory computer-readable media that store a convolutional neural network configured to be implemented by one or more processors, the convolutional neural network comprising:
   one or more inverted residual blocks, each of the one or more inverted residual blocks comprising:
      one or more expansion convolutional layers configured to produce, from an input with an initial number of channels, an expanded representation with an expanded number of channels, the expanded number of channels being larger than the initial number of channels;
      a linear convolutional bottleneck layer downstream of the one or more expansion convolutional layers, the linear convolutional bottleneck layer configured to produce a bottleneck tensor with a reduced number of channels lower than the expanded number of channels; and
      a residual shortcut connection between the linear convolutional bottleneck layer and one or more of:
         a next linear convolutional bottleneck layer of a subsequent inverted residual block of the one or more inverted residual blocks, or
         a previous linear convolutional bottleneck layer of a previous inverted residual block of the one or more inverted residual blocks.

13. The one or more non-transitory computer-readable media of claim 10, wherein the one or more expansion convolutional layers comprise a spatial convolutional layer that filters the expanded representation, and wherein the linear convolutional bottleneck layer projects the filtered expanded representation to the reduced number of channels.

14. The one or more non-transitory computer-readable media of claim 11, wherein the one or more expansion convolutional layers comprise one or more separable convolutional layers.

15. The one or more non-transitory computer-readable media of claim 12, wherein each of the one or more separable convolutional layers is configured to separately apply both a depthwise convolution and a pointwise convolution during processing of an input to such separable convolutional layer to generate a layer output.

16. The one or more non-transitory computer-readable media of claim 10, wherein, for each of the one or more inverted residual blocks, the linear convolutional bottleneck layer is structurally subsequent to the one or more convolutional layers.

17. A method, comprising:
  processing, by a computing system comprising one or more processors, image data using a neural network, the neural network comprising one or more inverted residual blocks, each of the one or more inverted residual blocks comprising:
    one or more expansion convolutional layers configured to produce, from an input with an initial number of channels, an expanded representation with an expanded number of channels, the expanded number of channels being larger than the initial number of channels;
    a linear convolutional bottleneck layer downstream of the one or more expansion convolutional layers, the linear convolutional bottleneck layer configured to produce a bottleneck tensor with a reduced number of channels lower than the expanded number of channels; and
    a residual shortcut connection between the linear convolutional bottleneck layer and one or more of:
      a next linear convolutional bottleneck layer of a subsequent inverted residual block of the one or more inverted residual blocks, or
      a previous linear convolutional bottleneck layer of a previous inverted residual block of the one or more inverted residual blocks.

18. The method of claim 17, wherein the one or more expansion convolutional layers comprise a spatial convolutional layer that filters the expanded representation, and wherein the linear convolutional bottleneck layer projects the filtered expanded representation to the reduced number of channels.

19. The method of claim 18, wherein the one or more expansion convolutional layers comprise one or more separable convolutional layers.

20. The method of claim 19, wherein each of the one or more separable convolutional layers is configured to separately apply both a depthwise convolution and a pointwise convolution during processing of an input to such separable convolutional layer to generate a layer output.

\* \* \* \* \*